United States Patent [19]

Merrifield

[11] 4,237,917
[45] Dec. 9, 1980

[54] UNDERWATER DIVING SYSTEM

[75] Inventor: Daniel B. Merrifield, Orange County, Calif.

[73] Assignee: U.S. Divers Co., Santa Ana, Calif.

[21] Appl. No.: 847,725

[22] Filed: Nov. 2, 1977

Related U.S. Application Data

[63] Continuation-in-part of Ser. No. 529,410, Dec. 4, 1974, Pat. No. 4,062,356.

[51] Int. Cl.³ .......................................... G05D 16/10
[52] U.S. Cl. ................................. 137/116.3; 137/613; 137/860
[58] Field of Search ..................... 137/505.39, 505.41, 137/505.42, 116.3, 860; 251/DIG. 1

[56] References Cited

U.S. PATENT DOCUMENTS

| | | | |
|---|---|---|---|
| 2,595,156 | 4/1952 | Matasovic | 137/505.42 X |
| 2,625,954 | 1/1953 | Klein | 137/505.42 X |
| 2,854,991 | 10/1958 | Webster | 137/505.42 X |
| 3,045,688 | 7/1962 | Fay | 137/505.42 X |
| 3,139,901 | 7/1964 | Camp | 137/505.18 |

*Primary Examiner*—Martin P. Schwadron
*Assistant Examiner*—Richard Gerard
*Attorney, Agent, or Firm*—George F. Bethel; Patience K. Bethel

[57] ABSTRACT

The disclosure of this specification illustrates and teaches the use of a self contained breathing apparatus for attachment to a user's back and incorporates a plurality of tanks having a manifold between them that is common to all with a single filling block leading thereto, and a reserve system mounted at one end thereof. The reserve system comprises a poppet valve which signals a loss in pressure by closing, after which it can then be actuated to open it for supplying the remaining portion of the reserve breathing gas through the manifold.

The system also has a first and second stage regulator to provide regulated breathing gas to a user. The first stage regulator incorporates a dynamically balanced piston which is supported by an O Ring or torroidal member that is deformed through its cross section to provide movement to the valving piston. The O Ring is eliptical through its cross section. First stage regulation is caused by the deformation of the eliptical cross sectioned O Ring, rather than substantial sliding thereof. At the same time the O Ring is implaced in juxtaposition to a ledge and formed so that upon overpressurization of the intermediate pressure zone such as through valve failure, the O Ring can provide pressure relief to the intermediate pressure system. This avoids inadvertent strains and failures of the downstream system, such as the conduits, hoses, and second stage regulator connected thereto.

The entire system is encapsulated within a package or casing which can be opened along a parting line thereof and which is secured by over-center latches. The casing has a number of straps and support members attached thereto forming a harness that a user places around his torso.

6 Claims, 12 Drawing Figures

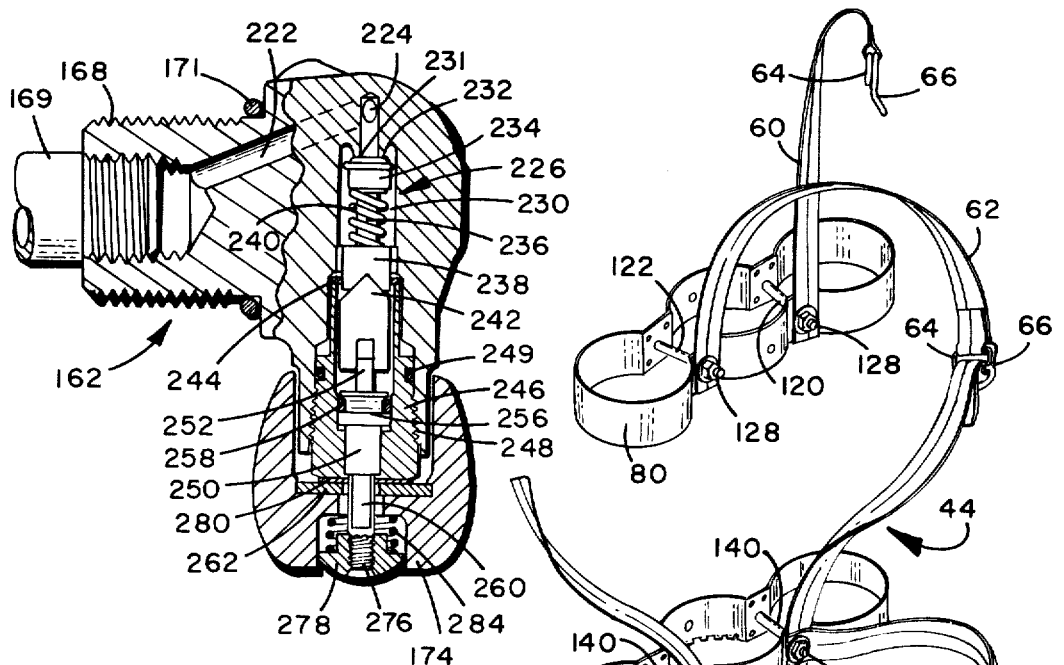
FIG. 10
FIG. 11
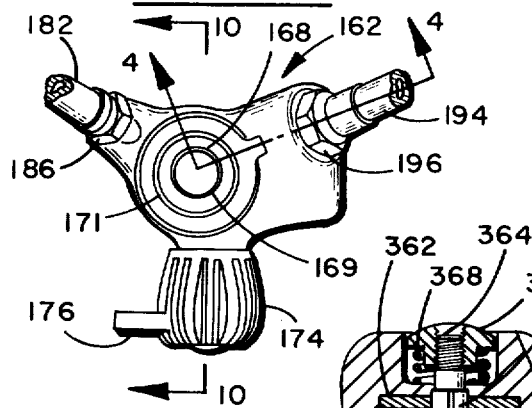
FIG. 9
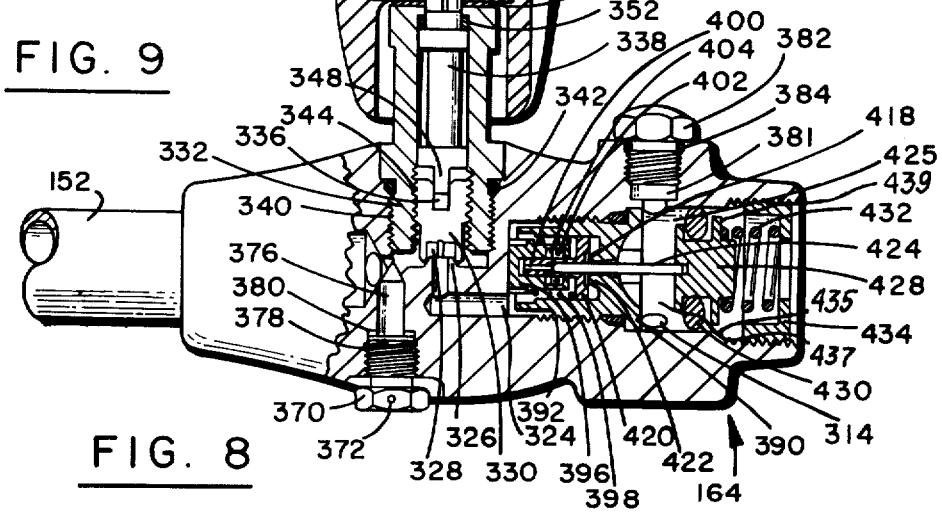
FIG. 8

UNDERWATER DIVING SYSTEM

This case is a continuation-in-part of my previously filed case for an Underwater Diving System, bearing Ser. No. 529,410 and filed on Dec. 4, 1974, now U.S. Pat. No. 4,062,356.

BACKGROUND OF THE INVENTION

1. Field of the Invention

The field of this invention lies within the self contained breathing gas apparatus art. Specifically, it resides within the self contained breathing apparatus art as it relates to systems for regulating and providing breathing gas under pressure within an entire system, utilizing demand regulators, reserve control valves, and pressurized gas tanks. It particularly relates to first stage regulation of gas in combination with a relief valve function attendant therewith in the event the first stage regulator fails.

2. The Prior Art

The prior art related to self contained breathing gas apparatus incorporates the utilization of single and multiple tanks with a conduit between them. The conduit is usually valved so that the breathing gas can escape from the tanks to be regulated by a first stage regulator.

Such first stage regulators incorporate a piston having a sealing surface which dynamically operates inwardly and outwardly, thereby opening and closing a valve port connected thereto which is exposed to high pressure gas. The opening and closing of the valve port allows for the transition of gas from the high pressure tanks to a conduit at intermediate pressure, leading to a demand regulator.

It has been generally accepted practice in the operation of the regulator piston to use a number of springs to bias the piston. In the piston seal it has been customary to incorporate various seals and dynamically sealing O Rings and washers.

This invention incorporates an eliptical cross sectioned O Ring which does not substantially slide within the regulator cavity. To the contrary, the O Ring supports the piston and is deformed across its cross section by the variable pressure as demanded. In other words, upon demand, the O Ring is deformed through its cross section by virtue of a change in spring loading on the piston and allows an openinig of a valve which the piston operates. The O Ring also serves a relief valve function to allow blow-by of excessive intermediate pressure that can be caused by first stage regulator bleeding or failure.

The entire system utilizes a shell or casing that can be opened along a parting line thereof which is secured by a snap buckle arrangement. The tanks of the system, in contradistinction to the prior art, are supported within deformable straps around each respective tank that are secured in turn by bolts to the casing. In contradistinction thereto, the prior art has specifically relied upon a backpack or support plate for the breathing gas tanks to be secured to and carried by. In this invention, the tanks are maintained within a formed casing which is conformed to a user's back and streamlined.

The controls to the system are mounted through the casing. Thus, the valving of the tanks can be controlled by a valve on the exterior of the casing. The filling of the tanks can be provided through a filling tube which can be extended from the casing and attached to a high pressure breathing gas source.

To the contrary, the prior art utilizes a filling manifold attached to a valve which is not easily accessible. The instant invention overcomes the filling problems of the prior art by providing a filling port that is easily accessible and removed from its securement fitting.

A reserve valve mechanism is incorporated within the manifold of the system to provide a warning of when the pressure in the breathing gas tanks drops below a certain level. The reserve valve closes an opening through the reserve system at a pre-established pressure which can then be opened by twisting a reserve knob which opens the valve again, thereby making the reserve supply of air available to the user.

In the prior art, the reserve system is connected to a single tank. The reserve system in the prior art is inaccessible to a user and cannot be relied upon to serve a user effectively. To the contrary, this invention provides an easily accessible reserve valve which serves the function of maintaining a reserve pressure in one tank that can be supplied to the remaining tanks.

The prior art also provides pressure gauge attachments that move freely and as a consequence can be broken off when a diver is swimming. This invention provides a pressure gauge which is incorporated within the entire system and can be attached to one of the straps comprising the harness so that it does not move freely.

As a consequence, the entire casing and system within the casing of this invention is an advance over the art by incorporating a completely unitized system with all the necessary support apparatus therefor. The entire system is carried and utilized as a unit much in the same manner of when people in outer space have an entire life support system incorporated on their back. Thus, this invention is a substantial advance over the prior art as it relates to self contained breathing gas apparatus and life support systems for both terrestial and underwater breathing use.

SUMMARY OF THE INVENTION

In summation, this invention incorporates a breathing gas system having an outer casing which encapsulates the active components of the system. The outer casing can be harnessed to a user's back for supporting and carrying the components of the system during the movements of a user.

More specifically, the casing of this invention can be opened along a parting line and secured by a plurality of latches therealong. The casing is strapped to one's back and conforms at the body interface generally to the user's back conformation so as to comfortably ride on a user's back.

Within the casing, a plurality of pressure tanks are attached by means of deformable straps which are bolted to the casing. The pressure tanks are interconnected by a manifold system incorporating a regulator for first stage pressure regulation and a reserve valve mechanism. The regulated gas from the regulator is supplied to a second stage or demand regulator on a hose extending through the casing. The reserve valve mechanism and the regulator are provided as a portion of the manifold.

The first stage regulator of this invention utilizes a unique dynamic oblate O Ring which deforms with respect to variable pressures imposed thereon. The deformation of the oblate O Ring is inherently within the cross sectional configuration thereof. In addition to the operation of the dynamic portion of the O Ring functioning through its deformation, the foregoing also operates as a relief valve. The relief valve serves to provide relief from overpressurization in the intermediate pressure zone to compensate for first stage regulator failures, while at the same time preventing overpressurization of the system. This thereby creates a situation wherein the first stage regulation is safer, more effective, and provides for inadvertent overpressurization by relieving such excess pressure.

The entire system is controlled by handles extending from the casing and incorporates a pressure gauge which can be read externally from the casing. The pressure gauge is attached to a hose which is connected to the high pressure portion of the manifold.

The entire system provides a substantial improvement over the prior art as will be seen in the following disclosure by incorporating an improved regulator, reserve, manifold connecting means, and breathing gas system incorporated in one casing.

BRIEF DESCRIPTION OF THE DRAWINGS

The invention will be more clearly understood by reference to the description below taken in conjunction with the accompanying drawings wherein:

FIG. 8 shows a sectional view of the first stage regulator of this invention as seen in the direction of arrows 8—8 of FIG. 3;

FIG. 9 shows a plan view of the reserve valve of this system in the direction of Lines 9—9 of FIG. 3;

FIG. 10 shows a sectional view of the reserve mechanism within the reserve valve of this invention in the direction of Lines 10—10 of FIG. 9;

FIG. 11 shows a separated perspective view of the tank straps and supporting harness straps which a diver uses; and, FIG. 12 shows a partially sectioned view of the filling block of this invention as encircled by circle 12 of FIG. 7.

DESCRIPTION OF THE PREFERRED EMBODIMENTS

The Outer Casing

Figure 2:
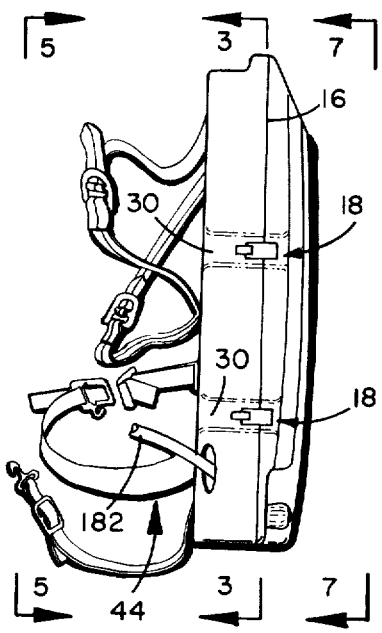
FIG. 2 shows a side elevation view of this invention in the direction of Lines 2—2 of FIG. 1.
Figure 1:
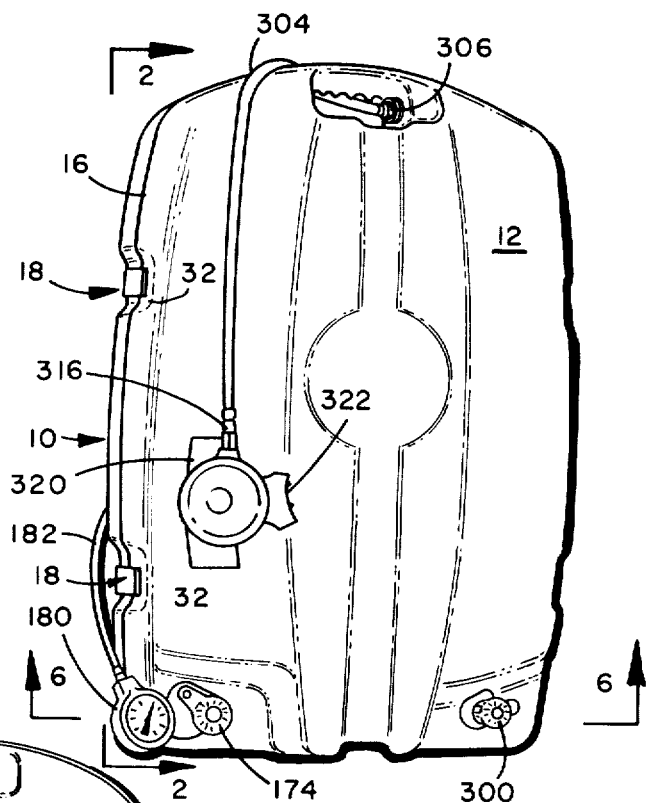
FIG. 1 shows a perspective upright view of the outer casing and system of this invention.
Figure 3:
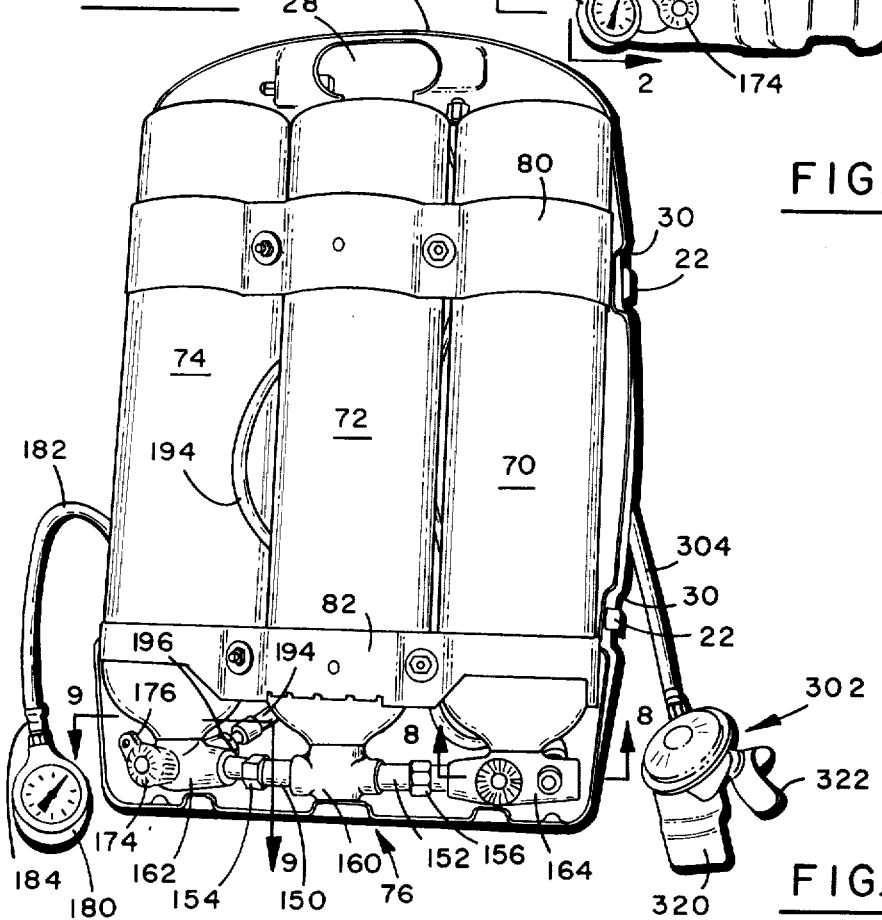
FIG. 3 shows the interior of this invention as sectioned along its parting line in the direction of Lines 3—3 of FIG. 2.
Figure 12:
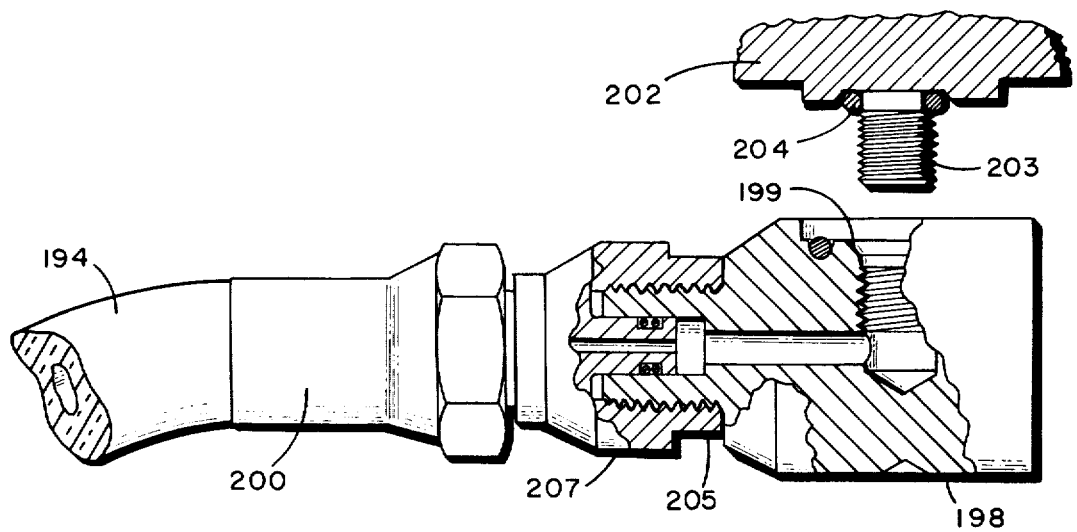

Looking at the figures, it can be seen that an outer casing 10 is shown with a front portion 12 and a back portion 14. The front portion 12 and the back portion 14 are separated along a parting line 16. The two portions of the casing 10 are secured at the parting line by means of latches 18 which comprise a catch portion 20 and a hook 22. The catch portion 20 latches onto the hook portion 22 as is generally done in over-center latch arrangements.

The front portion of the case 12 is formed with a handle 26 and an opening 28 therethrough. The handle 26 is molded into both the front 12 and back portion 14 and forms an integral member of the entire casing. The casing 10 can be formed of a plastic or a metal sheet, or built up of reinforced plastic resin. In the specific embodiment as shown, it has been formed from ABS (acrylonitrile-butadiene-styrene) plastic and then provided with the respective fittings necessary to form the entire system of this invention.

The casing 10 has a number of depressions for certain fixtures in order to prevent catching and snagging thereof. Specifically, depressions 30 and 32 are utilized for enabling the latches 18 to be depressed within the outer periphery of the casing to avoid snagging of the latches.

In addition thereto, a depression 34 is implaced within the back of the casing 14 for receipt of the bolts which hold the internal portions of the system in a secure manner. Additionally, a pair of depressions 38 and 40 are provided on the back 14 for purposes of depressing bolts and their associated nuts which serve to hold the internal structure as well as the straps of the harness of this invention.

Looking more particularly at the straps, an entire harness 44 is shown. The harness 44 has a waist strap 46 which is joined by a buckle 48. The waist strap 46 is served by a crotch strap 50. The crotch strap 50 has a loop 52 which can be secured to the buckle 48. The crotch strap 50 with its loop 52 is secured to the buckle 48 by means of a hook 53 on the buckle. The crotch strap 50 incorporates two members of a Y, namely straps 56 and 58. The entire crotch strap when implaced prevents the casing 10 from sliding over a user's shoulders when the user is in an upside down position.

A pair of shoulder straps 60 and 62 are utilized with the harness. Each of the shoulder straps 60 and 62 incorporate a unique buckle formed of two members 64 and 66, facilitating rapid escape from the system if necessary. The shoulder straps 60 and 62 are secured to the casing by a series of bolts in a manner to be described.

Main Pressure System

The main pressure system of this invention incorporates a plurality of tanks 70, 72 and 74. The tanks 70, 72 and 74 are high pressure vessels having an interiorly threaded neck at the base thereof, which can receive a threaded fitting such as a nipple in the interior thereof. A manifold 76 is connected to the interior of the threaded fitting of the tank. The manifold 76 incorporates the first stage reserve regulator valve and filling means of this invention which will be described in detail.

The tanks are circumscribed by an upper tank strap 80 and a lower tank strap 82. The upper tank strap 80 conforms with three circular loops 84, 86 and 88 to the tanks 70, 72 and 74. The circular loops are joined by flattened portions 90, 92, 94 and 96. Each of the flattened portions have an opening therethrough to receive a bolt.

In like manner, the lower tank strap 82 has a series of flats 100, 102, 104 and 106. The lower strap 82 with the respective flats 100 through 106 are continuously formed with circular portions 110, 112 and 114. When the openings through the flats 90 through 96 and 100 through 106 are provided with a bolt passing therethrough, the tanks 70, 72 and 74 are secured in tightened relationship therein.

The entire structure is secured by bolts 120. The bolts 120 have a plurality of nuts and washers respectively 126 and 130 on either side. The nuts 128 serve the function of securing the tanks 70, 72 and 74 into the back plate 14. The nuts backed by washers are seated in the depressed areas 34 so as to lie beneath the outer periphery of the back of the back plate 14.

In the same manner, the above flats 100 through 106 of the lower strap 82 receive bolts 140 that are served by nuts 142. In addition thereto, the washer arrangement of the previous description related to the strap 80 secures the lower strap 82 to the back of the back plate 14.

Breathing System

The breathing gas tanks or pressure vessels 70, 72 and 74 are connected to the manifold 76 by means of threads within the neck of each tank 70 through 74.

The manifold in its component parts has two pipes 150 and 152. The two pipes 150 and 152 each respectively have a wrench surface in the form of a hexagonal nut 154 and 156 which serves the function of allowing the manifold to be unthreaded and replaced or connected for repair or assembly purposes. These pipes are O-ring sealed at their ends in such a way as to allow a width adjustment to be made on the pressurized assembly by virtue of the thread advancement when the pipes are rotated. This assures a fit within the outer casing 10. The manifold 76 also has a center connection member 160 which serves to interconnect the pipes 150 and 152.

A reserve valve assembly 162 and a valve and regulator assembly 164 are each respectively shown with their female threads threaded onto the pipes 150 and 152.

The reserve assembly 162 has an upright threaded portion 168 which fits into the tank 74. The manifold interconnect 160 has an upright male threaded connection 170 that fits into the pipe or tank 72. In like manner, the valve and regulator assembly 164 has an upright male connection 172 which threads into the base or neck of the tank 70.

Each one of the foregoing components will be described in detail and provide the function which allows the entire system to operate.

The reserve assembly 162 has a knob 174 with a lever 176 extending therefrom. The lever 176 allows a turning of the knob in order to provide the reserve gas when a pre-established pressure has been reached.

The pressure of the entire system on the high pressure side can be monitored by means of a pressure gauge 180 connected to a hose 182. The hose 182 is in turn threaded into the reserve valve assembly 162.

At either end of the hose 182 are fittings respectively 184 and 186 that are swaged onto the hose and provided with a male threaded insert for accommodating the respective gauge and reserve assembly.

The reserve valve assembly 162 is interconnected by a hose 194 which is the filling hose. The hose 194 is swaged with a fitting 196 that is secured to the reserve valve assembly 162. The hose 194 leads to a filling connection 198. The filling connection 198 is fundamentally a block shaped to provide a connection with a yoke and screw type fitting at the outlet end of a high pressure air supply hose. The female threaded opening 199 can receive gas under pressure which is provided thereto and is sealed during filling by an O Ring 201. The block 198 is threaded by threads 205 to a swivel 207 that is connected to the swaged connection 200 on the hose 194. The swivel allows the block to be maintained on the casing 10 and then withdrawn for use.

Figure 4:
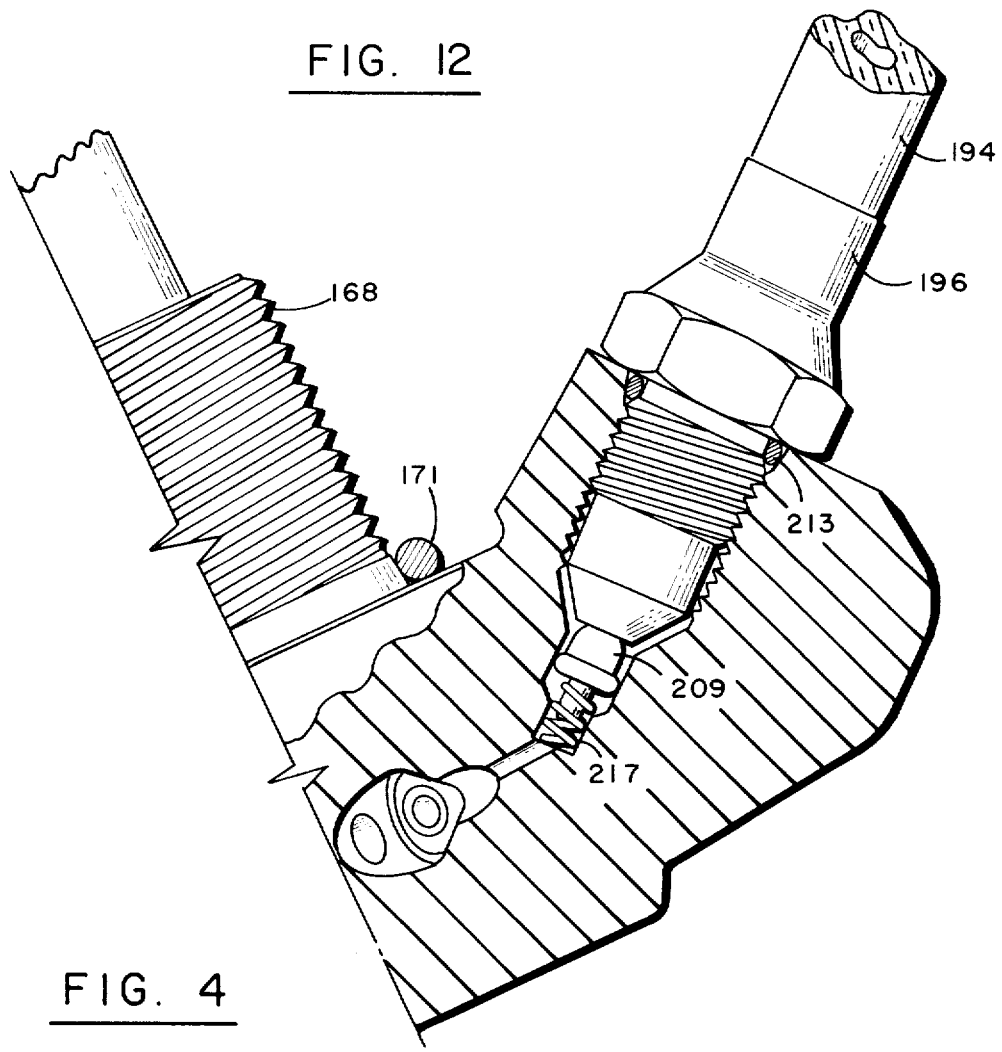
FIG. 4 shows a sectional view of the filling poppet of this invention in the direction of Lines 4—4 of FIG. 9.
Figure 5:
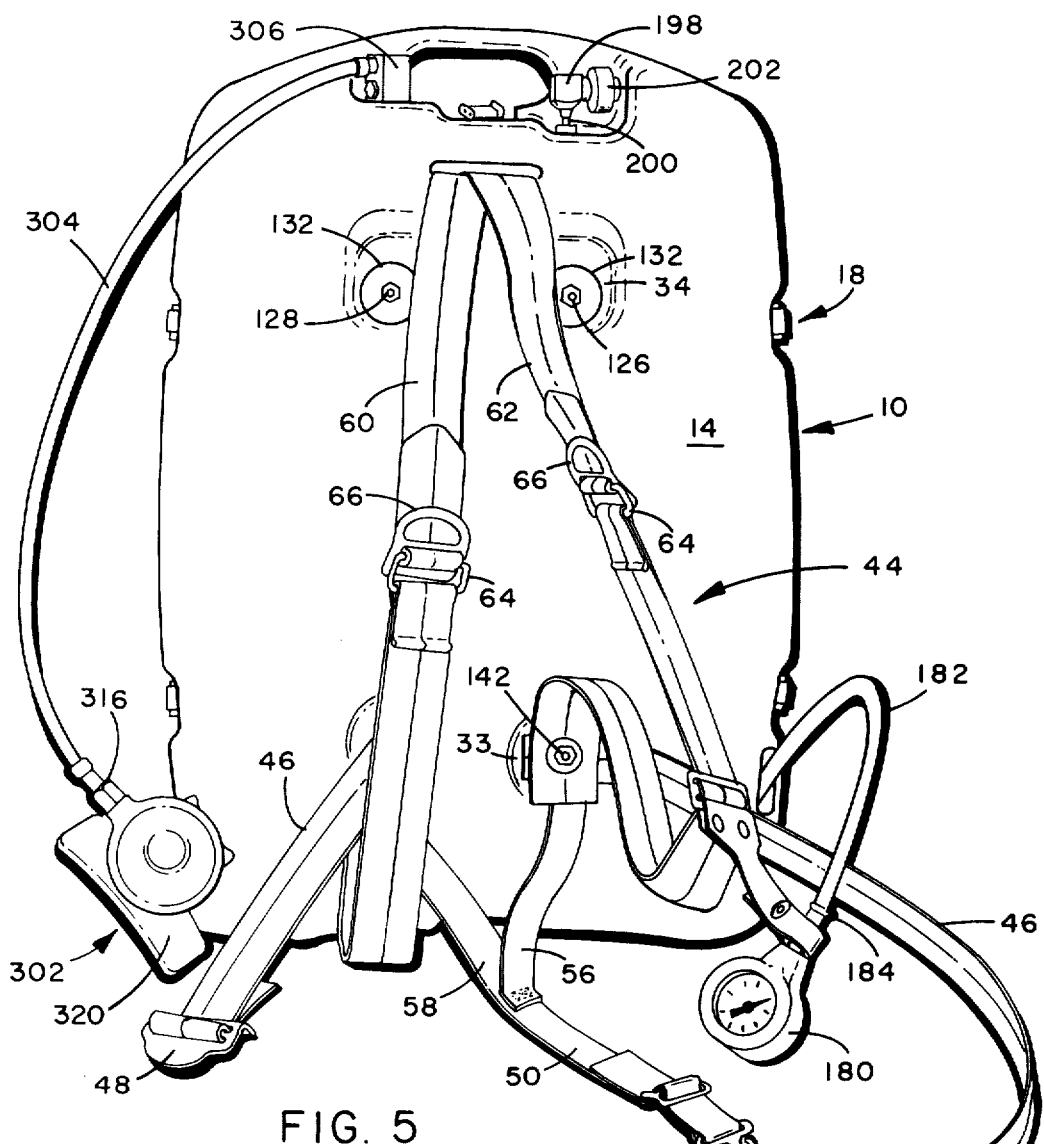
FIG. 5 shows a reverse view from that shown in FIG. 1 along the surface where the system is interfaced with a user's back in the direction of Lines 5—5 of FIG. 2.
Figure 6:
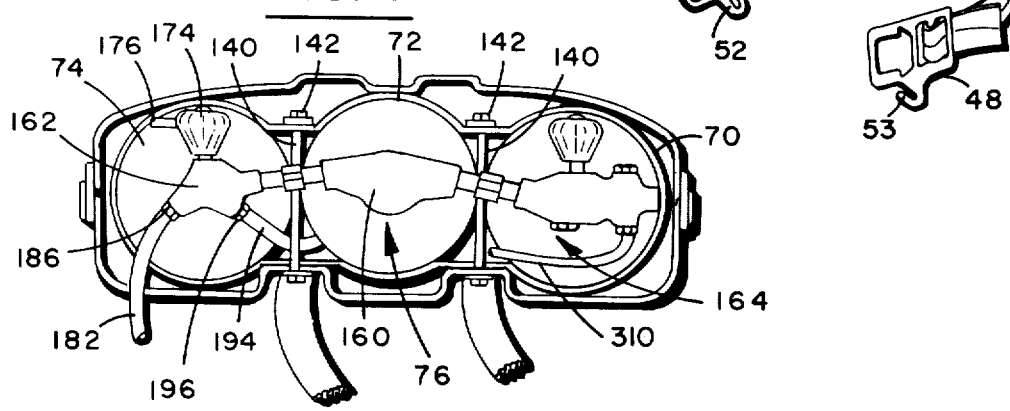
FIG. 6 shows a sectional view through part of the casing and a bottom view of the tanks and manifold of the system in the direction of Lines 6—6 of FIG. 1.
Figure 7:
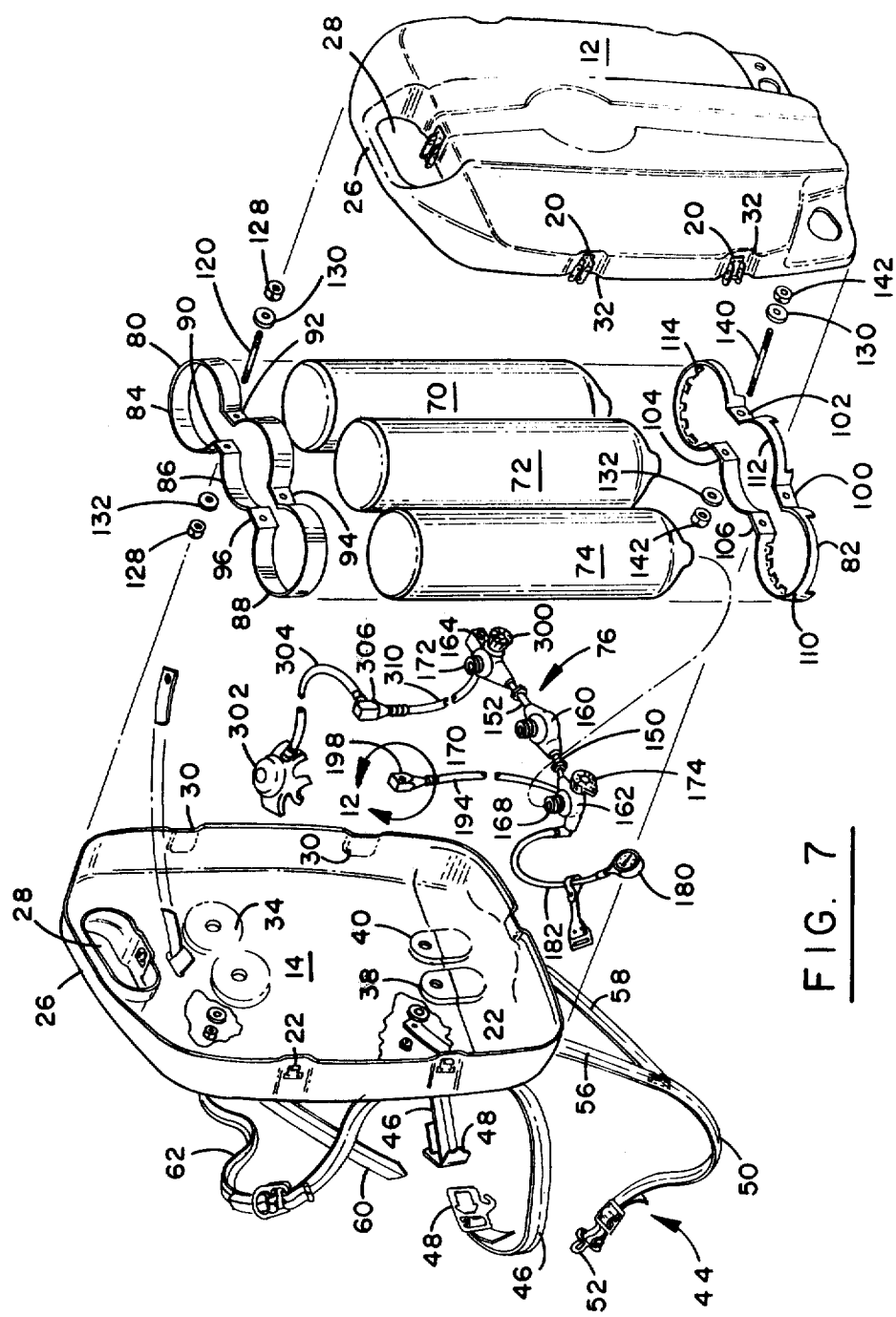
FIG. 7 shows an exploded perspective view of the main components of this invention as exploded from the front to the rear in the direction of Lines 7—7 of FIG. 2.

The block 198 can be provided with a poppet valve therein, or a poppet valve can be provided within the reserve assembly itself as shown in FIG. 4. Regardless of the place where the poppet valve is provided, it should provide displacement in a positive direction when the filling pressure is exerted thereon.

The reserve valve assembly 162 in this embodiment incorporates a poppet valve 209 that is formed as a mushroom. The rounded valving surface thereof seats against an inlet opening within a threaded portion of the swaged fitting 196, which is sealed by an O Ring 213.

The poppet 209 is biased by a spring 217. The spring urges the poppet 209 closed until a filling pressure is received from a pressurized source of gas.

In operation, the filling block 198 receives a male fitting into its opening and is sealed by the O Ring 201. The gas passes into the block 198 which is mounted on the swivel 207 and to the swaged hose fitting 200 on the block. The gas then passes into the reserve assembly where it is valved by the poppet valve 209, and allowed to flow into the manifold and then into the tanks.

The filling block 198 is maintained on the casing 10 by means of a knurled knob 202 that has machine threads 203 thereon that thread into the filling block threads 199 to hold it when the filling system is not in use.

The knurled screw 202 is attached to the side of the casing 10 within the handle opening 28. In this manner, the threaded knurled knob 202 can secure the filling block 198 thereagainst until it has been removed and is ready for filling.

In these relative positions, the knurled screw 202 is sealed against the filling block 198 by the O Ring 201, thereby preventing the entry of water into the system when in use. A smaller O Ring 204 serves as a secondary or backup high pressure seal in the event of gas leakage past the poppet valve 209.

The filling block 198 can also be withdrawn from the casing after it has been unthreaded from the knurled knob 202 due to slack in the hose 194. After it is withdrawn, the swivel allows it to turn on the swaged fitting 200 for purposes of rotationally orienting the filling block 198 in a particular direction that is best for accommodating a pressurized filling source of gas.

Reserve Assembly Detail

Looking more particularly at FIGS. 9 and 10, it can be seen that the reserve assembly 162 is shown with its knob 174. The knob 174 has the lever 176 extending therefrom to provide greater turning leverage for operation. The lever 176 can furthermore be provided with an opening as shown, in order to connect a lanyard thereto for remote operation.

The reserve assembly 162 is shown with the hose 182 that is connected to the pressure gauge, by means of a swaged swivel fitting 186. In addition thereto, the filling hose 194 is shown with a swaged fitting 196 which threads into the reserve assembly 162.

The male threads 168 of the reserve assembly 162 are shown with internal threads to receive a threaded pipe 169 which threads into the reserve assembly for purposes of providing a deeper conduit into the tank 74 associated therewith. In order to seal the tank 74 more securely onto the reserve assembly 162, an O Ring 171 is shown surrounding the fitting 168 which threads into the tank 74. The reserve assembly 162 is connected to the pipe 150 and serves as part of the manifold.

Looking more specifically at the reserve assembly, it can be seen that the high pressure portion of the system is exposed to conduit 222. The gas from the high pressure side is caused to pass through a port 224 against a poppet assembly 226 and out through a passage in the general area of cavity 230. The poppet assembly 226 is such that it causes a valve member or cover 232 formed as a portion of a poppet 234 to seal a valve seat. The valve surface 234 is enhanced by a plastic disc which has been secured into the piston 234.

A poppet stem 236 is connected to a male cam member 242 which is allowed to slide up and down in spring biased relationship with the female cam element 238 by a spring 240. The spring 240 maintains the male cam element 242 having an upright V member against a female cam element 238. The female cam element 238 is such that it receives the male cam element 242 therein in a deep groove. The deep groove and male and female cams are shown in FIG. 10 seated in the high differential pressure mode with the reserve handle lever 176 not yet manually actuated. In other words, the tank pressure has not dropped to such a level that it generates insufficient force to continue to hold the poppet off the seat 231 against the opposing force of a spring 240.

In the "on reserve" (manually actuated) pressure mode, the male cam section 242 is turned ninety degrees and rides in a diminutive slot across the female cam element 238 which is at right angles to the major slot as shown in the FIG. 10 illustration. The male cam 242 positioned in this manner, has moved against the force of spring 240 repositioning the poppet away from the seat and allowing the gas pressure to equalize above and below the valve seat 231. The female cam element is secured in place by a washer 244 surrounding the female cam element. The washer is in turn held in place by a bonnet 246.

The bonnet 246 having threads 248 is shown threaded by the threads into the entire reserve assembly 162. The bonnet 246 is sealed by an O Ring 249 into the reserve assembly 162. The handle 174 is connected to a stem 250 having a key 252 which is received within a slot in the male cam 242. The stem 250 with the key 252 has a grooved annular portion 256 which receives an O Ring 258 therein. The O Ring serves to seal the stem 250 into the bonnet to prevent gas leaking therearound. As can be appreciated, high pressure gas is exposed to the area beneath the O Ring 258 and as a consequence, must be prevented from leaking by the stem 250 and the bonnet 246 interface.

The stem 250 has a square upper cross section 260 which is received within a washer 262 moulded within the handle 174. The washer 262 has a square opening that matches and receives the square portion 260 of the stem 250. This allows the handle 174 to engage and turn the stem 250. The handle 174 is held onto the stem by means of a threaded extension 276 on the stem 250 engaging a nut 278. The entire handle 174 is held in a spring biased position against a washer 280 by means of a spring 284 forcing it thereagainst, in opposition to the nut 278. By such securement, the handle 174 may be deflected by lateral forces which could otherwise damage its relationship with the stem 250.

In operation, the handle 174 is placed in a position to allow for a substantial degree of force by spring 240 against the valve surface 232. The force curtails the flow of gas from the port 224 between the valve surface 232 and seat below a pre-established pressure, in this case approximately 1000 psig.

When the pressure has slipped to 1000 psig, the force of the spring 240 cannot be overcome. As a consequence passage of gas beyond or below the valve surface 232 ceases. Afterwards, the user continues to breathe the remaining 1000 psig of air contained in tanks 70 and 72 until inhalation becomes difficult due to excessively low pressure.

In order to continue operation of the system below approximately 1000 psig, the handle 174 is turned, turning the male cam 242, thereby pushing it downwardly by virtue of its indexing with the diminutive slot in the female cam member 238 which is at a relatively lower level. In this position, the valve surface 234 is moved below or away from the valve seat 231. This allows the passage of gas around the valving member or valve surface 232, through the manifold and into tanks 70 and 72. The passage of gas equalizes the pressure at some considerable pressure below the 1000 psig reserve set point, in this case, approximately 300 psig. The user is now free to breathe the remaining gas to depletion.

Regulator Assembly

Looking at the regulator assembly 164, it is shown with a handle 300 that provides a valving function. The regulator assembly 164 is connected to the pipe 152 and serves as part of the manifold. It is also connected through its male pipe nipple connection 172, not shown in FIG. 8, to the tank 70, and sealed thereto by an O Ring surrounding the pipe nipple 172.

The valve and regulator assembly 164 is connected to a second stage or demand regulator 302 through a hose 304. The connection is interfaced with a connecting block 306 which is exposed at the upper portion of the back plate 14. The connecting block 306 connects the demand regulator 302 by a second hose 310 to the first stage regulator assembly 164 by a port 314 having an outlet connected thereto which has not been shown.

Thus, regulated breathing gas under first stage regulation is provided from the port 314 to the second stage regulator 302 through the foregoing connections. The second stage regulator 302 is a diaphragmatic type which is well known in the art. It is connected by a swaged fitting 316 to the hose 304. The demand regulator 302 has an outlet manifold 302 provided for the exhalation of gas. The second stage regulator 302 also has a mouthpiece 322 which fits into a breather's mouth so that a breather can exhale and inhale at will through the demand regulator 302.

The first stage regulator 164 comprises both a regulator and a valve assembly. The valve assembly is for purposes of disconnecting the entire high pressure system from the second stage regulator by means of the valve handle 300.

Looking more specifically at the valve and regulator assembly 164 where it relates specifically to its valving function, it can be seen that the handle 300 allows the passage of gas to the regulator portion through a passage 324. The passage 324 has an upright conduit that is surrounded by a valve seat 326 covered by a valving surface 328. The valving surface is primarily a plastic surface that has been secured into a valve retainer 330. The valve retainer is threaded into a housing 332. The retainer 330 has a slot 336 or key way which receives a valve stem 338. The valve stem 338 is operatively connected to the handle 300 in a manner to be described.

The valve housing 332 is threaded into the valve body by threads 340 and is sealed by means of an O Ring 342 which has been shown in a conformed condition as it seats against the flange of the housing.

The conduit 324 is connected to the high pressure side of the system through the upright male connection 172 by which the valve and regulator assembly is threaded into the tank 70. The pipe connection 172 contains a filter element through which all gas must pass when traveling toward the passage 324 from any other part of the high pressure system.

The housing 332 also incorporates interior threads 344. The interior threads 344 receive the retainer 330 so that it can threadedly travel upwardly and downwardly within the threads thereof. Of course, as it moves upwardly, it tends to open the passage 324 which is covered by the valving surface 328 which covers the valve seat 326.

The stem 338 is provided with a male key 348 which fits the slot 336 so that it turns the retainer 330 which in effect acts as a traveller. The stem 338 with the key 348 is turned by the handle 300 which in turn rides on a washer 350 and is sealed by a second washer 352.

The stem 338 has a rectangular portion 360 which mates with a second rectangular opening in a washer 362 that has been cast within the handle 300. The handle 300 is molded around the washer 362 so that it will not turn within the handle 300. The plastic handle 300 with the washer 362 provides a square opening in its center when it is molded therein so that the handle turns the square portion of the stem 338 and thus the valve retainer 330.

The whole assembly of the handle 300 and the valve stem 338 is secured by means of a threaded extension 364 on the valve stem 338. The threaded extension 364 receives a nut 366. The handle 300 is held in a spring biased position against the washer 350 by a spring 368 in opposition to the nut 366. This allows the handle 300 to bend from its axial position when a lateral force is imposed against it, so that it does not damage the relationship of the valve stem 338 with the retainer 330 and the attendant valving apparatus.

In order to protect the high pressure side of the entire system, a blowout plug 370 is threaded into the body of the valve and regulator assembly 164. The blowout plug 370 has a port 372 which is in connected relationship to an axial port which passes through the plug into a high pressure passage 376 connected to the remainder of the high pressure system. A copper disc 378 is secured by the plug 370 and is backed by a washer or gasket 380 which serves to seal the plug 370. The intent is that the copper disc 378 rupture and pass the increased gas pressure through the port 372 before the system fails in its entirety. As a consequence, the rupture disc is designed for the maximum pressure which is desired within the system prior to its failure.

A second intermediate pressure outlet port 381 is capped and plugged by a threaded plug 382 having a hexagonal nut surface. The threaded plug 382 is secured in the valve and regulator housing against leakage by means of an O Ring 384.

The intermediate pressure port 314 which goes to the second stage regulator hose 310 is served by valving the high pressure breathing gas from the passage 324. Of course, the high pressure breathing gas from the passage 324 can only be delivered thereto after the valve handle 300 has been turned for purposes of releasing the valving surface 328 from the valve seat 326. This causes the gas to flow through the passage 324 and be regulated by the first stage regulator of this invention.

High pressure gas is delivered to an area adjacent a cavity provided by an interior opening of a seat block 390. The seat block 390 is threaded into the regulator and valve assembly by means of threads 392 that are matching between the regulator assembly and seat block. The seat block accommodates a spring block 396 which receives a spring 398 thereagainst. The spring block 396 serves to guide a seat disc retainer or poppet 400.

The seat disc retainer or poppet 400 is sealed within the spring block by means of an O Ring 402 and a backup washer 404. This serves to seal the high pressure breathing gas from the intermediate pressure breathing gas. This is necessary because after the high pressure gas is valved, the high pressure breathing gas can leak alongside the edges of the interface between the poppet 400 and spring block 396.

The seat disc retainer or piston 400 has a valving surface 418 in the form of a plastic disc which has been secured into the relatively square flange 420 of the seat disc retainer or poppet. This serves to provide a valving function against the angular edges of the valve seat 422 provided by the seat block.

The poppet or seat block retainer 400 is balanced by virtue of an opening therethrough which is exposed to intermediate pressure on the intermediate side of the valve closure function of the regulator. In order to cause the seat block retainer or poppet to move from the seat, a pin 424 is utilized to move the seat block retainer or piston away from its valving function. This occurs when an imbalance is sensed due to a person requiring air during breathing, which creates a negative pressure within the cavity 425 relative to that on the opposite side of the piston 428.

The term intermediate pressure zone, such as cavity 437 has been defined due to the first stage regulator being used both as a second stage regulator or demand regulator 302. However, the cavity 437 can be vented to any passage requiring gas and in effect functions as either an intermediate or ultimate pressure source, depending upon the end use of the gas. The intent is that intermediate pressure herein also refers to any lower pressure provided by the regulator.

The pin 424 is seated within a piston or main regulating piston 428 having an enlarged O Ring 430 around an annular groove thereof. The piston 428 is not only sealed by the O Ring, but the O Ring 430 itself acts as a deformation element for providing movement to the piston 428 through its cross section, rather than through any sliding movement on the interior surface of the bore of the regulator cavity. The piston 428 is held in place by means of a spring 432 held by an adjustment screw 434 which mates with matching threads in the regulator.

In operation, the negative pressure of the piston on the intermediate side in cavity 437 causes a deformation of the cross sectional material of the O Ring 430 so that the spring 432 moves it along with an attendant pin 424 to cause the seat disc retainer or poppet 400 to move from the valve seat 422. This, of course, valves high pressure breathing gas into the intermediate pressure zone and to the hose 310 that is connected to the second stage regulator 302 that is connected to a breather's mouth. In accordance with the foregoing action, when one inhales the imbalance thereby causes the foregoing valving and the supply of regulated intermediately pressurized breathing gas.

Looking more particularly at the showing of FIG. 8, it can be seen that the torroidal shaped ring or eliptically sectioned oblate O Ring 430 is in close juxtaposition to a ledge 435 in the first stage regulator. The proximity to the ledge enables the torroidal shaped oblate ring 430 to flex backwardly and forwardly thereon through its cross section during its operative deviations. Additionally, the torroidal element 430 can be pushed by overpressurized gas in the cavity 437 to an overcenter position beyond the ledge 435, thereby allowing relief of any pressure within the cavity 437. It can also be flexed entirely so as to deflect from its contact points to allow the relief of gas from cavity 437 to pass around the eliptically sectioned ring 430. Thus, pressure relief within the cavity 437 is provided when overpressurization of the intermediate pressure zone is caused such as through first stage regulator failure. Thus, upon regulator valve failure through surface 418 or any other particular case of intermediate zone overpressurization, relief can take place past the torroidal ring 430 by its being pushed over the ledge 435 or flexed to create a space at its interface to allow for a blow-by of any overpressure within the cavity 437.

The reasons for failure of the first stage regulator are generally because of debris, such as metal shavings or other materials being entrained or trapped between the valve surfaces or other operating mechanisms. This causes the regulator valve forming the valving surface 428 that has a plastic or rubber disc secured into the square flange 420 of the seat disc or poppet to remain open. In addition to the valving surface becoming fouled in one of the foregoing manners, it also becomes worn in some cases.

In the foregoing instances, the intermediate or lower pressure that is being valved thereby, namely, the pressure within cavity 437 and within the hoses between the first and second stage regulator leading from cavity 437, is excessive. The excessive pressure is such that if the second stage regulator does not provide for relief by flow or other means, the passages and lines connected with the cavity 437 can possibly break. The foregoing breakage is due to the fact that the flow through the valve surface 418 is such that it is from the high pressure side to the intermediate or lower side into cavity 437 and is not regulated, but at a pressure which is beyond the pre-established intermediate pressure.

As can be understood, the opening and closing of the valve across seat 418 during regulation is the one factor which prevents flow and substantial overpressurization. This being the case, flow should be prevented from excessively pressurizing the second stage regulator beyond its normal design limits and also the attendant conduits or tubing leading therefrom connected to the cavity 437.

From the foregoing, it can be seen that the eliptically shaped torroidal element 437 which provides a relief valve function when the cavity 437 becomes overpressurized, is of extreme importance.

As a design adjunct, the piston 428 which holds the torroid 437 in place, is placed in relationship to the spring 432 depending upon the pressure in the cavity 437 that is to be relieved. The further the torroid 437 is placed from the ledge 435, the less the relief will be available given the same spring constant or rate. In other words, the further away the torroid 430 is placed, the greater the pressure in the intermediate pressure zone connected to cavity 437 is required before a relief function will take place.

As a further design adjunct, the spring constant or rate of spring 432 is of importance in allowing for the relief function, inasmuch as it is a factor in the amount of pressure that can be exerted within the cavity 437. Also, the flange, wall, or backup portion 439 of piston 428 against which the torroid 430 is seated, creates a situation wherein it is larger or smaller with respect to the area of the torroid depending upon whether it is to either respectively reinforce or limit the amount of flexure of the torroid. The area of this backup function respectively increases or diminishes the amount of pressure that is required to create relief by the torroid 437 flexing in a manner whereby it will allow the passage of gas between itself and the adjacent walls.

Suffice it to say, the placement of the relief valve or torroidal member 430 in proximity to the ledge 435, the spring constant of the spring 432 and the size of the shoulder or wall 439, and the resiliency and character of the elastomer of the torroid 430 are all established and specified, depending upon the amount of pressure that is to be relieved from the cavity 437. This, of course, is a design function as to the upper amount of intermediate or lower pressure desired within the downstream members connected to cavity 437.

As can be seen from the foregoing specification, this invention should be read broadly in light of the advance of the art hereof which provides a combined self contained breathing system. The combined system utilizes regulatory reserve functions and other auxiliary functions in a single unit incorporated in a streamlined configuration that enables a diver to encapsulate all the functions of his life support systems into one case. It further provides a unique first stage regulator that incorporates a relief valve to prevent excessive intermediate pressures from damaging the components connected thereto. As a consequence, this invention should be read as to its breadth and scope in light of the following claims.

I claim:

1. A breathing gas regulator for regulating and valving a high pressure source of gas into a lower outlet pressure zone which can then be further regulated or conducted in any suitable manner from the outlet pressure zone comprising:

a valve body:

means connecting said valve body to said high pressure source;

a valve implaced within said valve body controlling flow communication between said high pressure source and outlet pressure zone;

a torroidal member mounted around a pistion member having one side exposed to ambient pressures and the other side exposed to the outlet pressure;

a linkage connected to said valve at one end and to said piston member at the other end;

passage means between said valve and said torroidal member connected to the outlet pressure zone to which said piston member is exposed for receiving regulated gas through said valve;

spring biasing means for biasing said piston member so that as differential outlet pressures are sensed, said spring with said torroid flexing through its cross section and not substantially sliding in relationship to said regulator wall during its regulation function will act to provide for passage of gas through said valve to which they are connected by said linkage through pressure imbalances across said piston member; and, wherein said torroid has a configuration such that it can flex away from the adjacent regulator wall to serve the function of a relief valve by allowing the flow of gas to ambient pressure when said outlet pressure zone within said passage exceeds a predetermined value beyond the pressures to be regulated.

2. The regulator as claimed in claim 1 further comprising:

a ledge in direct proximate relationship to said torroid, over which said torroid can move in order to allow the flow of gas for relief from the outlet pressure zone connected to said passage.

3. The regulator as claimed in claim 2 further comprising:

a manually operated valve connected to high pressure on one side and to said first valve on the other side to allow flow to be regulated when said manually operated valve is opened.

4. A regulator for regulating breathing gas from a high pressure source to an outlet pressure zone comprising:

a valve which is implaced between said high pressure source and said outlet pressure zone controlling flow communication between said high pressure source and outlet pressure zone;

said regulator having a cavity into which said high pressure source flows when said valve is opened;

a torroid mounted around a piston member, with means for supporting said torroid, interfacing said cavity and ambient pressure;

linkage means connected to said piston member for operating said valve when said torroid flexes through its cross section without substantially sliding along the walls of said cavity; and, spring biasing means connected to said piston member, said torroid having a configuration such that it can flex away from the adjacent regulator wall to cause said valve linkage to move when pressure differentials across said piston member occur, while at the same time allowing for excessive pressures within said outlet pressure zone to be bled to ambient by said torroid being displaced from the walls of said cavity in the direction of ambient pressure.

5. The regulator as claimed in claim 4 wherein:

said means for supporting said torroid comprises a circumferentially channeled piston in which said torroid is seated.

6. The regulator as claimed in claim 5 wherein:

said torroid has an elliptical cross section.

* * * * *